(12) United States Patent
Bartha

(10) Patent No.: US 12,012,939 B2
(45) Date of Patent: Jun. 18, 2024

(54) WIND BLADE HAVING A LIGHTNING PROTECTION SYSTEM

(71) Applicant: LM Wind Power R&D (Holland) B.V., Heerhugowaard (NL)

(72) Inventor: Laszlo Bartha, Heerhugowaard (NL)

(73) Assignee: LM Wind Power R&D (Holland) B.V., Heerhugowaard (NL)

( * ) Notice: Subject to any disclaimer, the term of this patent is extended or adjusted under 35 U.S.C. 154(b) by 0 days.

(21) Appl. No.: 17/907,553

(22) PCT Filed: Jun. 1, 2021

(86) PCT No.: PCT/EP2021/064703
§ 371 (c)(1),
(2) Date: Sep. 28, 2022

(87) PCT Pub. No.: WO2021/245096
PCT Pub. Date: Dec. 9, 2021

(65) Prior Publication Data
US 2023/0142518 A1    May 11, 2023

(30) Foreign Application Priority Data
Jun. 2, 2020 (GB) .................... 2008264

(51) Int. Cl.
*F03D 80/30* (2016.01)
*F03D 1/06* (2006.01)

(52) U.S. Cl.
CPC .......... *F03D 80/30* (2016.05); *F03D 1/0675* (2013.01); *F05B 2240/303* (2020.08); *F05B 2240/304* (2020.08); *F05B 2240/307* (2020.08); *F05B 2280/4007* (2013.01); *F05B 2280/6003* (2013.01)

(58) Field of Classification Search
CPC ...................................................... F03D 80/30
See application file for complete search history.

(56) References Cited

U.S. PATENT DOCUMENTS

| | | | |
|---|---|---|---|
| 2012/0141277 | A1 | 6/2012 | Yarbrough et al. |
| 2012/0243992 | A1 | 9/2012 | Grabau |
| 2015/0167642 | A1 | 6/2015 | Hansen |
| 2016/0131110 | A1 | 5/2016 | Livingston et al. |
| 2016/0222945 | A1 | 8/2016 | Shiraishi et al. |
| 2016/0298608 | A1 | 10/2016 | Whitehouse et al. |

(Continued)

FOREIGN PATENT DOCUMENTS

| | | | |
|---|---|---|---|
| EP | 2159560 | A2 | 3/2010 |
| EP | 2246558 | A2 | 3/2010 |

(Continued)

*Primary Examiner* — Brian O Peters
(74) *Attorney, Agent, or Firm* — Nath, Goldberg & Meyer; Jerald L. Meyer; Tanya E. Harkins

(57) ABSTRACT

A lightning protection subsystem for a wind blade is presented. The lightning protection subsystem includes one or more conductive segments, where each of the one or more conductive segments include a conductor and a coupling portion, where the coupling portion is configured to secure the one or more conductive segments to an edge of the wind blade. Further, the one or more conductive segments form an elongated lightning conducting path along at least a portion of the length of the edge, at an outer surface of the wind blade.

22 Claims, 10 Drawing Sheets

(56) References Cited

U.S. PATENT DOCUMENTS

2018/0274521 A1    9/2018  Akhtar et al.
2021/0164447 A1*   6/2021  Collard .................. F03D 80/30
2021/0363963 A1*  11/2021  Fujita ..................... B29C 53/04

FOREIGN PATENT DOCUMENTS

| EP | 2532893 A1    | 12/2012 |
|----|---------------|---------|
| GB | 2218473 A     | 11/1989 |
| WO | 2005031158 A2 | 4/2005  |
| WO | 2011096500 A1 | 8/2011  |
| WO | 2013007267 A1 | 1/2013  |
| WO | 2015055213 A1 | 4/2015  |
| WO | 2020011326 A1 | 1/2020  |

* cited by examiner

WIND BLADE HAVING A LIGHTNING PROTECTION SYSTEM

This is a National Phase Application filed under 35 U.S.C. 371 as a national stage of PCT/EP2021/064703, filed Jun. 1, 2021, an application claiming the benefit of Great Britain Application No. 2008264.0, filed Jun. 2, 2020, the content of each of which is hereby incorporated by reference in its entirety.

BACKGROUND

Embodiments of the present specification generally relate to a lightning protection subsystem. In particular, the present specification discloses a lightning protection subsystem disposed along an edge of a wind blade, on an outer surface of the wind blade. The present disclosure also relates to method of installation of lightning protection subsystem along the edge of the wind blade.

It may be noted that lightning protection subsystem typically includes conductors/cables disposed in inner cavity of the wind blade. More specifically, the lightning conductors/cables are disposed along the shear web of the wind blade. Since, the lightning conductors/cables are disposed in the inner cavity of the wind blade, it is difficult to access the lightning conductors/cables. In case of failures in the lightning conductors/cables, it is difficult to access and repair the lightning conductors/cables. Manholes may need to be provided on wind blade surface to access the lightning conductors disposed in the inner cavity. These manholes/access panels are large holes on the wind blade surface and may in turn impact structural integrity of the wind blade.

In recent times, use of the lightning conductor/cables on the outer surface of the wind blade is disclosed. However, these lightning conductors/cables affect the aerodynamic profile of the wind blade. Accordingly, the aerodynamic performance of the wind blade is affected.

Moreover, generally, the lightning conductors/cables are long continuous cables. Hence, in the case of modular/split blades if a single continuous cable is employed as the lightning conductor, the transportation of different sections of the wind blades separately is not feasible. This in turn adds to the complexity of transport of long wind blades.

It is also known to integrate down conductors into the leading edge and/or the trailing edge of the wind turbine blade. However, such systems have the same problems as lightning protection systems with an internal down conductor and are further difficult to service.

BRIEF DESCRIPTION

In accordance with aspects of the present specification, a lightning protection subsystem for a wind blade is presented. The lightning protection subsystem includes one or more conductive segments, where each of the one or more conductive segments include a conductor and a coupling portion. The coupling portion is configured to secure the one or more conductive segments to an edge of the wind blade. Further, the one or more conductive segments form an elongated lightning conducting path along at least a portion of the length of the edge, at an outer surface of the wind blade.

In accordance with yet another aspect of the present specification, a method of manufacturing a wind blade having a lightning protection subsystem is presented. The method of manufacturing the wind blade includes moulding at least a portion of a wind blade and disposing one or more conductive segments along at least a portion of length of an edge of the wind blade, where the one or more conductive segments include a conductor and a coupling portion, where the coupling portion is configured to secure the one or more conductive segments to the edge of the wind blade, and where the one or more conductive segments form an elongated lightning conducting path along at least a portion of a length of the edge, at an outer surface of the wind blade.

In a preferred embodiment, the lightning protection subsystem may further include a plurality of connecting segments, where at least one connecting segment of the plurality of connecting segments is disposed between two conductive segments of the one or more conductive segments.

In a further preferred embodiment, the elongated lightning conducting path includes a lightning conductor, a lightning conducting cable, or a combination thereof. In another preferred embodiment, an airgap exists between at least two conductive segments, and wherein the airgap aids in conduction of electrical current.

In another preferred embodiment, the plurality of connecting segments is made of flexible material.

In another preferred embodiment, the one or more conductive segments comprise an outer covering wrapping at least partially the conductor, and wherein the outer covering comprises an insulator.

In another preferred embodiment, the insulator comprises composites, a thermoplastic material, or a combination thereof.

In another preferred embodiment, the one or more conductive segments are configured to provide a desired aerodynamic profile of the wind blade.

In another preferred embodiment, first dimensions of the one or more conductive segments vary along the length of the edge of the wind blade.

In another preferred embodiment, the first dimensions of the one or more conductive segments comprise at least one of height, length, and width of the one or more conductive segments.

In another preferred embodiment, the one or more conductive segments have a tapering geometry.

In another preferred embodiment, the one or more conductive segments comprise at least one of carbon fibres and conductive metals.

In another preferred embodiment, at least one conductive segment of the one or more conductive segments is disposed at a tip end of the wind blade.

In another preferred embodiment, at least one conductive segment disposed at the tip end of the wind blade acts as a toroid of the lightning protection subsystem.

In another preferred embodiment, the edge of the wind blade is at least one of a leading edge and a trailing edge. The conductive segments may advantageously have a substantially triangular cross-section for arrangement at the trailing edge of the wind blade.

In another preferred embodiment, the coupling portion of the one or more conductive segments comprises one or more first attachment subunits.

In another preferred embodiment, the one or more conductive segments form a portion of an aerofoil surface of the wind blade.

In one embodiment, a wind blade comprising a lightning protection subsystem.

In another embodiment, one or more conductive segments are secured to the edge of the wind blade using an adhesive.

In a preferred embodiment, the wind blade comprises one or more receiving units along the edge of the wind blade.

In another preferred embodiment, the coupling portion of each of the one or more conductive segments is received in the corresponding receiving unit of the one or more receiving units.

In another preferred embodiment, second dimensions of the one or more receiving units complement the first dimensions of the one or more conductive segments.

In yet another preferred embodiment, the second dimensions of the one or more receiving units comprises at least of depth, length, and width of the one or more receiving units.

In another preferred embodiment, moulding at least the portion of the wind blade includes forming one or more receiving units along an edge of the wind blade.

It is clear that the conductive segments are preferably connected to an exterior of the wind blade. Further, it is clear that the system is modular and that a plurality of the conductive segments may form a down conductor of the lightning protection system. The conductive segments may further be electrically connected to one or more receptors, or one or more of the conductive segments may function as a receptor. This makes the system easy and cost-effective to service, e.g. after a lightning strike, where part of the lightning protection system or blade may be damaged. The conductive segments may advantageously each have a longitudinal extent of 50-500 cm, preferably 50-250 cm.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

As will be described in detail hereinafter, various embodiments of a wind blade having a lightning protection subsystem and method of manufacturing a wind blade having a lightning protection subsystem are disclosed. As will be appreciated, the lightning protection subsystem includes lightning conducting cable, toroid, and lightning receptors. The present specification discloses use of conductive segments to form a lightning conducting path along an edge of the wind blade. The edge of the wind blade may include a leading edge of the wind blade, a trailing edge of the wind blade, and the like. Although the present specification describes some embodiments of the conductive segments, use of other embodiments of conductive segments to form a lightning conducting path is also anticipated.

In accordance with the embodiments of the present specification, the lightning conducting path is formed using one or more conductive segments disposed on an outer surface of the wind blade. Accordingly, it is relatively easy to access the lightning conducting path. Easier accessibility of the lightning conducting path enables hassle-free repair of the lightning conducting path in the event of a fault. Further, since the lightning conducting path is on outer surface of the wind blade, need of large manholes or hatches to access the lightning conducting cable is avoided. Furthermore, since the lightning conducting path may be formed using the conductive segments instead of a single long conductive cable, the proposed lightning conducting path is also suitable for modular blades/split blades. This in turn allows a comparatively easier transport of the modular blades/split blades.

Figure 1:
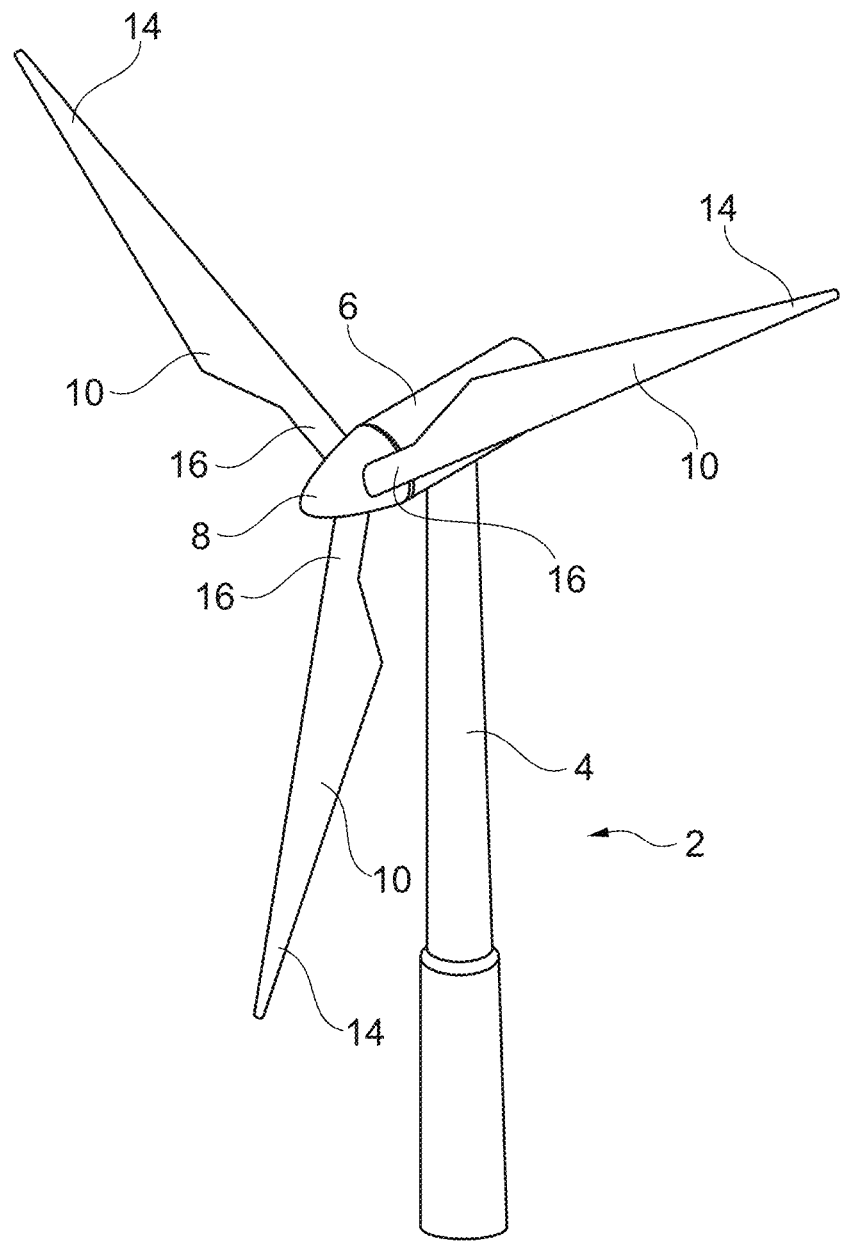
FIG. 1 illustrates conventional modern upwind wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
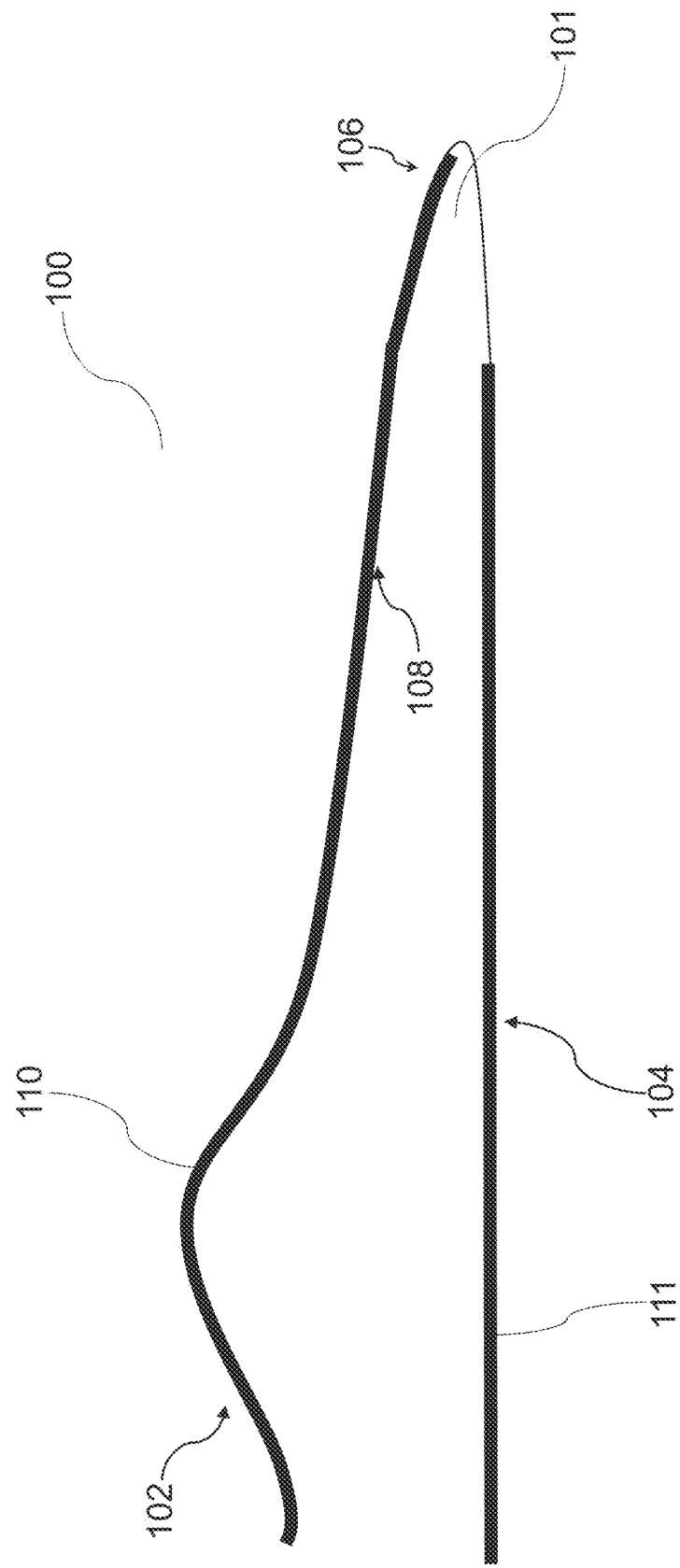
FIG. 2 is a diagrammatical representation of a wind blade with a lightning protection subsystem.

FIG. 2 is a diagrammatical representation 100 of a wind blade with a lightning protection subsystem in accordance with an embodiment of the present specification. A wind blade 101 includes an edge. In one example, the edge may include at least one of a trailing edge 102 and a leading edge 104. Reference numeral 106 represents an outer surface of the wind blade 101. Further, reference numeral 108 represents an inner surface of the wind blade 101.

In the example of FIG. 2, elongated lightning conducting paths 110 and 111 are disposed on the outer surface 106 of the wind blade 101. In one embodiment, the lightning conducting paths 110, 111 may be a lightning conducting cable, lightning conductor, down conductor and the like. The lightning conducting path 110 is disposed on outer surface 106 along the trailing edge 102 of the wind blade 101. More specifically, the lightning conducting path 110 is disposed along length of the trailing edge 102 of the wind blade 101. In another embodiment, the lightning conducting path 111 may be disposed along the leading edge 104 of the wind blade 101. Since, the lightning conducting paths 110 and 111 are disposed on the outer surface 106, it is easier to access the lightning conducting paths 110, 111 in the event of a fault.

In one embodiment, the lightning conducting paths 110, 111 are made of one or more conductive segments. The structure of the lightning conducting path 110 may be depicted in greater detail with respect to subsequent figures. Although the example of FIG. 2 represents two lightning conducting paths 110, 111 along the respective edges, use of only one of the lightning conducting paths 110 and 111 along any one of the edges of the wind blade is anticipated. Specifically, FIGS. 3-5 disclose the conductive segments 202 disposed along trailing edge of the wind blade. Further, FIGS. 6-9 represent conductive segments disposed along leading edge of the wind blade.

Figure 3:
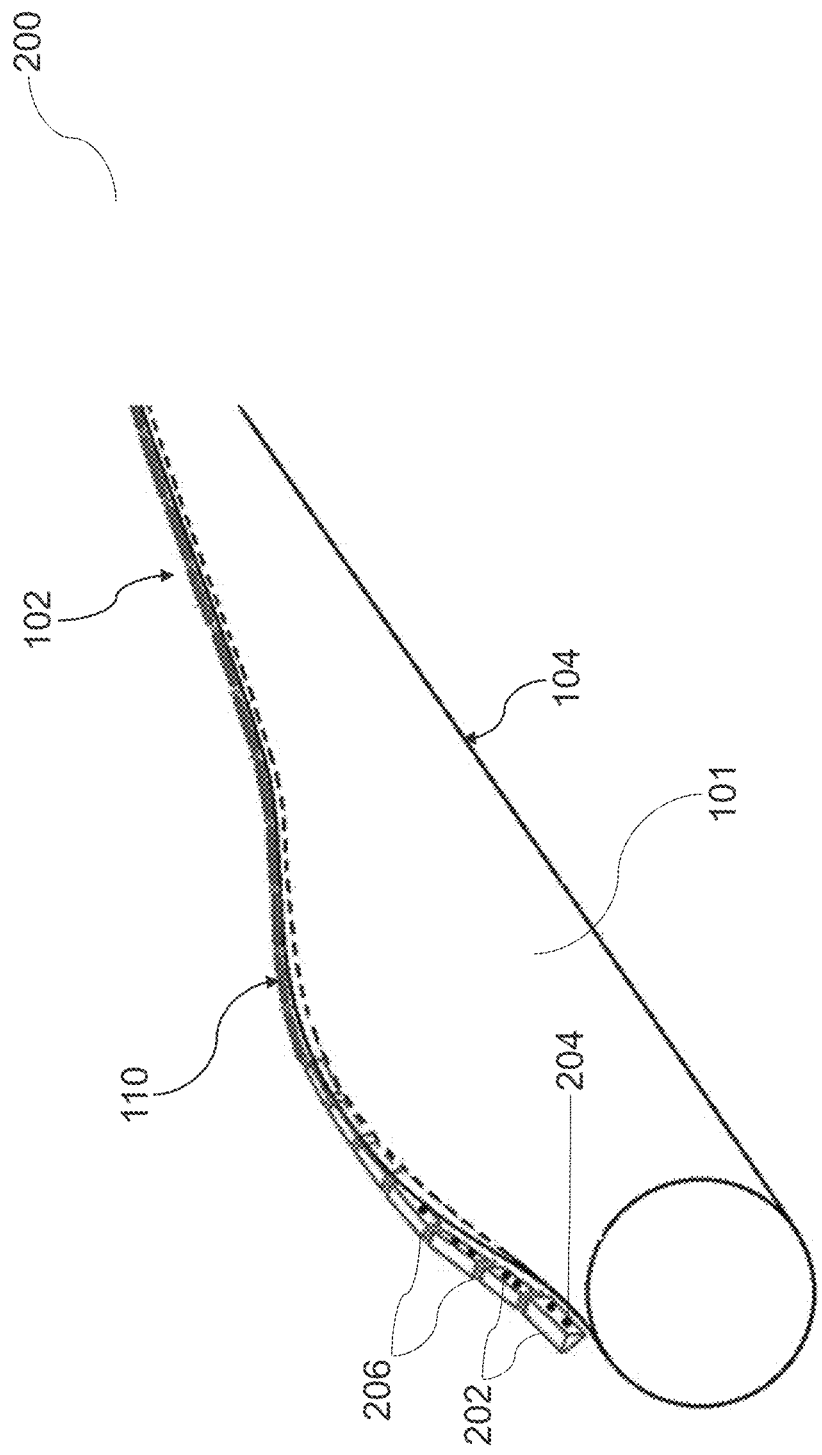
FIG. 3 is a detailed diagrammatical representation of at least a portion of the lightning protection subsystem disposed on a trailing edge of the wind blade.

FIG. 3 is a detailed diagrammatical representation 200 of at least a portion of the lightning protection subsystem disposed on a trailing edge of the wind blade. The wind blade 101 includes the trailing edge 102 and the leading edge 104. In this example, the wind blade 101 is manufactured in such a manner that the trailing edge 102 is a band of flatter surface when compared to existing wind blades. Specifically, the trailing edge 102 includes one or more receiving units (not shown in FIG. 3). The receiving units at the trailing edge 102 of the wind blade is described in detail with respect to FIG. 5.

In the example of FIG. 3, the lightning conducting path 110 is made of one or more conductive segments 202 disposed adjacent to one another. The one or more conductive segments 202 are couplable to the trailing edge 102. Specifically, each of the conductive segments 202 may be received in the corresponding receiving units of the wind blade 101. Once the conductive segments 202 are coupled to the trailing edge 102 a desired aerodynamic profile of the trailing edge of the wind blade 101 is achieved. Accordingly, the conductive segments 202 may form a portion of aerofoil surface of the wind blade. The term 'aerofoil surface,' as used herein, refers to a finished aerodynamic shell of the wind blade.

In one embodiment, each of the conductive segments 202 include a coupling portion 203. The coupling portion 203 is configured to secure the one or more conductive segments 202 to the edge 102 or 104 of the wind blade 101. In one embodiment, the coupling portion 203 is a portion of the conductive segment 202 which may be proximate and in physical contact with the edge 102 or 104 of the wind blade 101.

In the example of FIG. 2, the coupling portion 203 includes a first attachment subunit 204. The first attachment subunit 204 aids in coupling of the conductive segments 202 to the trailing edge 102 of the wind blade 101. Specifically, the conductive segments 202 is securely received in the respective receiving units (not shown in FIG. 2) at the trailing edge 102 of the wind blade 101. In addition, the conductive segments 202 may be coupled to the trailing edge 102 of the wind blade 101 using adhesive, glue, double sided adhesive tapes, fasteners, clip-on mechanism, click mechanism, rail-based mechanism, and the like.

The conductive segments 202 includes a conductor. In one example, the conductor includes a carbon fibre, other conductive metals, and the like. The conductive metals may include at least one of copper and aluminium. In one embodiment, the conductive segment 202 includes a conductor may be at least partially covered by an outer covering. This outer covering may be an insulator, such as but not limited to composites, thermoplastics, and the like.

Additionally, the lightning conducting path 110 includes a plurality of connecting segments 206. In one embodiment, at least one connecting segment 206 of the plurality of connecting segments is disposed between the two conductive segments 202. The connecting segment 206 disposed between the two conductive segments 202 aids in providing a continuous path for the flow of electric current. The connecting segment 206 is made of a flexible and conductive material. In one example, the conductive material includes a carbon fibre, conductive metals, and the like. In one embodiment, a combination of the one or more conductive segments 202 and the plurality of connecting segments 206 form the elongated lightning conducting path 110.

In another embodiment, instead of the connecting segment, an airgap is provided between two conductive segments 202. The airgap is narrow in width such that the airgap allows conduction of electrical current between the conductive segments 202. Thus, a continuous path may be provided for any electrical current that may flow via the lightning conducting path 110.

As noted hereinabove, the lightning conducting path 110 is disposed on an outer surface of the wind blade 101 along the trailing edge 102. Hence, in the event of a fault in the lightning conducting path 110, it can be easily accessed and repaired. In one embodiment, the faulty conductive segment 202 of the one or more conductive segments 202 may be replaced with a non-faulty, newer conductive segment 202.

In one embodiment, the conductive segment 202 disposed at tip of the wind blade 101 acts as a toroid of the lightning protection subsystem. Although, the example of FIG. 3 depicts conductive segments 202 coupled to the trailing edge 102, the conductive segments may be coupled along other edges of the wind blade 101. Further, in another example, the conductive segments may be a built-in structure along the trailing edge of the wind blade 101.

Figure 4:
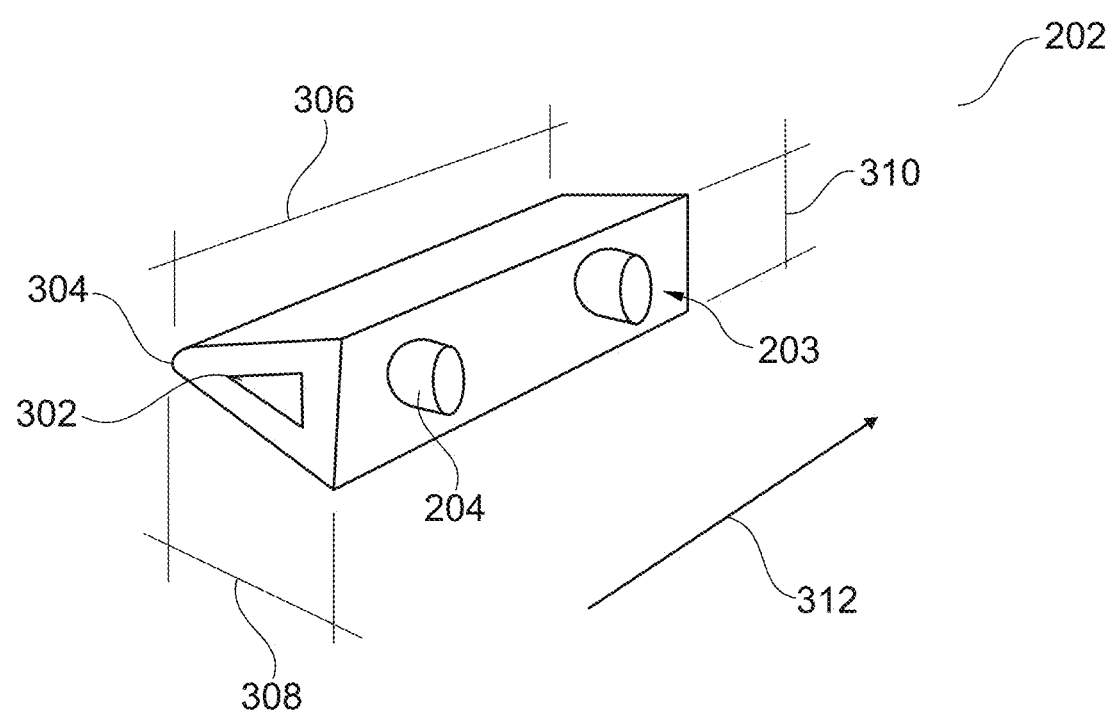
FIG. 4 is a diagrammatical representation of one embodiment of a conductive segment employed in the lightning protection subsystem of FIG. 3.

Now referring to FIG. 4, a diagrammatical representation of one embodiment of a conductive segment 202 employed in the lightning protection subsystem of FIG. 3 is disclosed. In the example of FIG. 4, the conductive segment 202 has a shape that defines shape of trailing edge of the wind blade 101. Thus, a desired aerodynamic profile of the trailing edge of the wind blade is achieved. In one specific embodiment, the conductive segment 202 is a wedge-shaped structure, e.g. with a substantially triangular cross-section as shown in FIGS. 3 and 4. In another embodiment, the conductive segment may be coupled to the leading edge of the wind blade. In this embodiment, the conductive segment may have a shape such that the conductive segment does not hinder the airflow when coupled at the leading edge of the wind blade.

Further, in the example of FIG. 4, the conductive segment 202 includes a first attachment subunit 204 which extends outwards. Moreover, the conductive segment 202 includes a conductor 302 having an outer covering 304. The outer covering 304 is an insulator. In one embodiment, the outer covering 304 may be a composite material. In the example of FIG. 4 the conductive segment 202 includes a conductor 302 embedded in the outer covering 304, such that the outer covering 304 entirely wraps around circumferential area of the conductor 302. In another embodiment, the conductive segment 202 may include the outer covering disposed in such a manner that the outer covering partially wraps around the conductor.

As noted hereinabove, the lightning conducting path 110 includes one or more conductive segments 202. The first dimensions of the conductive segments 202 of the lightning conducting path 110 may vary along the length of the edge, such as the trailing edge. The term 'first dimensions,' as used herein, refers to length, width, and height of the conductive segment. Reference numeral 306 represents a length of the conductive segment 202. Reference numeral 308 represents width of the conductive segment 202. Also, reference numeral 310 represents height of the conductive segment 202. The length 306, width 308, and height 310 varies for different conductive segments 202. Furthermore, in one example, the conductive segment 202 may have a tapering geometry along direction 312. Although the example of FIG. 4 depicts a wedge-shaped conductive segment 202, other dimensions, sizes, and shapes of the conductive segments is anticipated.

Figure 5:
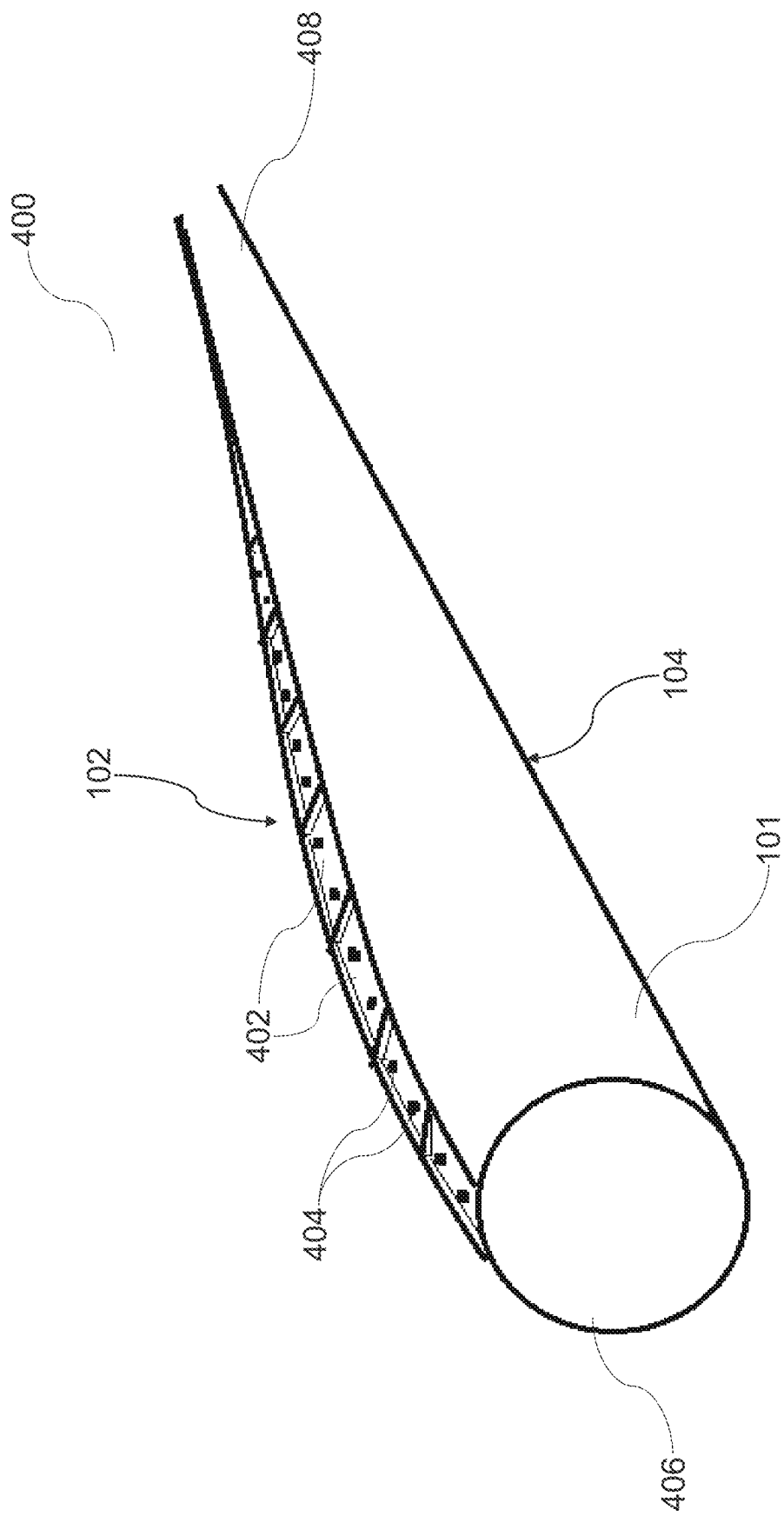
FIG. 5 is a diagrammatical representation of the trailing edge of the wind blade of FIG. 2.

FIG. 5 is a diagrammatical representation 400 of the trailing edge of the wind blade 101 of FIG. 2. The wind blade 101 includes a trailing edge 102 and a leading edge 104. Specifically, the example of FIG. 5, represents the trailing edge 102 of the wind blade 101. More specifically, FIG. 5 depicts the trailing edge 102 which is adapted is such a manner that it is configured to snugly receive the conductive segments.

As represented herein, the trailing edge 102 has relatively flatter surface when compared to the trailing edge of a traditional wind turbine blade. In one embodiment, the trailing edge is relatively thicker and chord length is shorter to enable coupling of the conductive segment 202. As clearly depicted in FIG. 5, the trailing edge 102 is designed to includes one or more receiving units 402. In one example, the receiving unit may be a single slot along the length of the trailing edge 102 configured to receive multiple conductive segments 202. In another example, a plurality of receiving units 402 may be formed along the length of the trailing edge 102.

Further, second dimensions of the one or more receiving units complement the first dimensions of the conductive segments. In one example, the second dimensions of the receiving units 402 may vary based on the first dimension of the conductive segments 202. Specifically, based on the first dimension of the conductive segments 202 that may be received at the receiving units 402, the second dimensions of the receiving unit 402 may be determined. Based on the determined second dimensions of the receiving units 402, the moulds may be prepared to create the desired dimension of the receiving units 402 along the trailing edge 102. The term 'second dimensions,' as used herein, refers to dimensions of the receiving units. Specifically, the second dimensions of the receiving units may include a depth, length, and width of the receiving units.

Additionally, the receiving unit 402 includes one or more second attachment subunits 404. The second attachment subunit 404 may include at least one of a slot, an aperture or a hole. The second attachment subunits 404 are configured to securely receive the first attachment subunits 204 of the conductive segments 202. Accordingly, the conductive segments 202 are securely coupled to the trailing edge 102. Once, all the receiving units 402 receive the respective conductive segments 202, a desired aerodynamic profile of the trailing edge of wind blade 101 may be obtained.

The conductive segments 202 disposed in the receiving units 402 at tip end 408 of the wind blade 101 has comparatively reduced height, width, and length when compared to the height, width, and length of the conductive segments 202 disposed in the receiving units 402 at root end 406 of the wind blade 101. Accordingly, the receiving units 402 at tip end 408 of the wind blade 101 has a relatively lesser depth, width, and length when compared to the depth, width, and length of the receiving units 402 at root end 406 of the wind blade 101.

Figure 6:
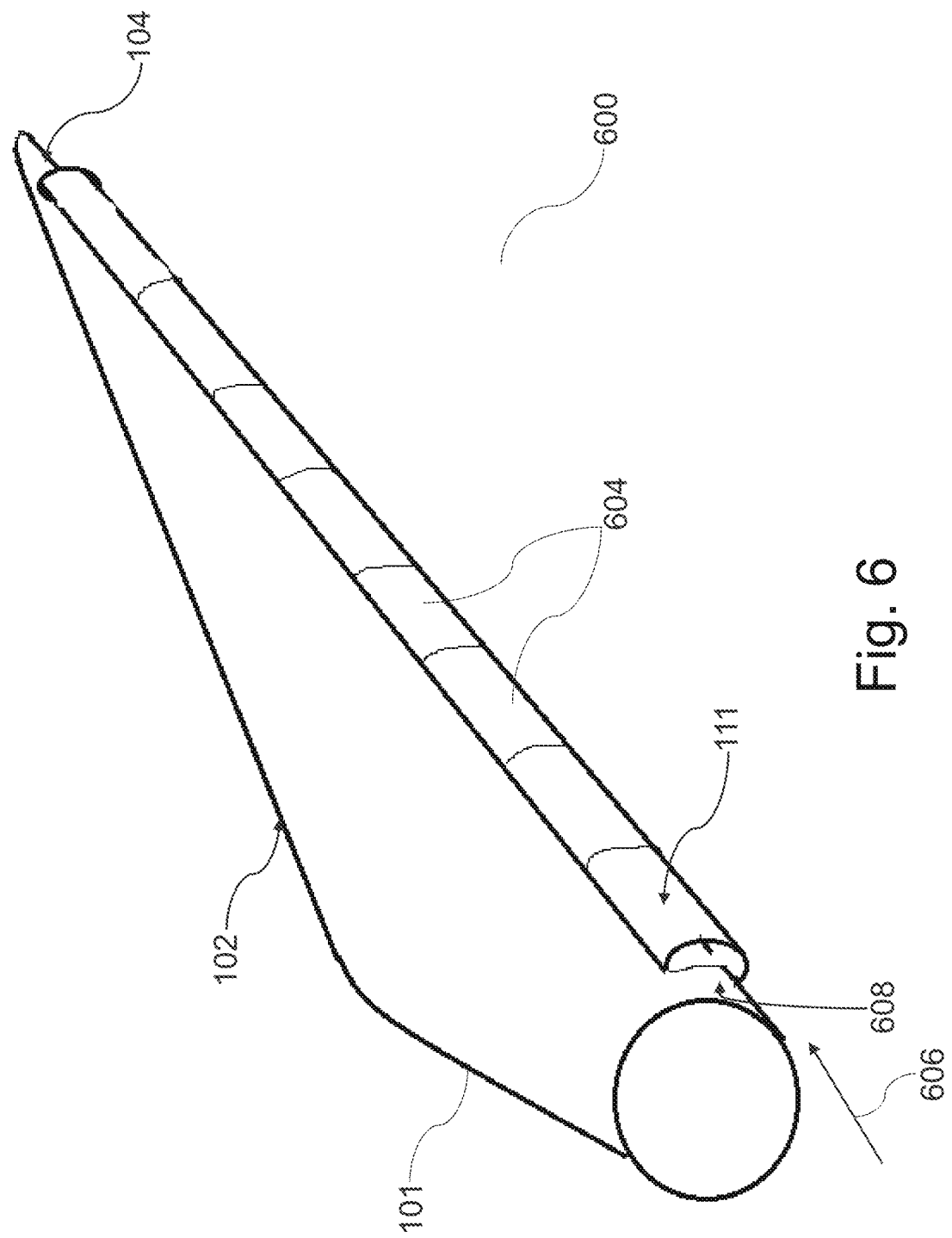
FIG. 6 is a diagrammatical representation of at least a portion of the lightning protection subsystem disposed on a leading edge of the wind blade.

FIG. 6 is a diagrammatical representation 600 of at least a portion of the lightning protection subsystem disposed on a leading edge of the wind blade. In the example of FIG. 6, the lightning protection subsystem includes the lightning conducting path 111. Further, the lightning conducting path 111 includes one or more conductive segments 604 disposed adjacent to one another. The one or more conductive segments 604 are couplable to the leading edge 104. Specifically, the conductive segments 604 are received on receiving units 608 along the leading edge 104. The receiving units 608 along the leading edge may include an even surface. Furthermore, the receiving units 608 may have a standard rounded shape similar to the leading edge shape of any standard wind turbine.

Once the conductive segments 604 are coupled to the leading edge 104 a desired aerodynamic profile of the leading edge of the wind blade 101 is achieved. More specifically, the conductive segments 604 are coupled to the leading edge 104 such that it does not hinder airflow along the leading edge 104. In one embodiment, the conductive segments 604 may be coupled to the leading edge 104 of the wind blade 101 using adhesive, glue, double sided adhesive tapes, fasteners, clip-on mechanism, click mechanism, rail mechanism, and the like.

The conductive segments 604 may include a conductor having an outer covering of an insulator. In one example, the conductor includes a carbon fibre, other conductive metals, and the like. The conductive metals may include at least one of copper and aluminium. One or more conductive segments 604 form the elongated lightning conducting path 111. Thus, a continuous path may be provided for any electrical current that may flow via the lightning conducting path 111.

As noted hereinabove, the lightning conducting path 111 is disposed on outer surface of the wind blade 101 along the leading edge 104. Hence, in the event of a fault in the lightning conducting path 111, it can be easily accessed and repaired. In one embodiment, the faulty conductive segment 604 of the one or more conductive segments 604 may be replaced with a non-faulty conductive segment 604. Accordingly, the lightning conducting path 111 may be repaired.

Figure 7:
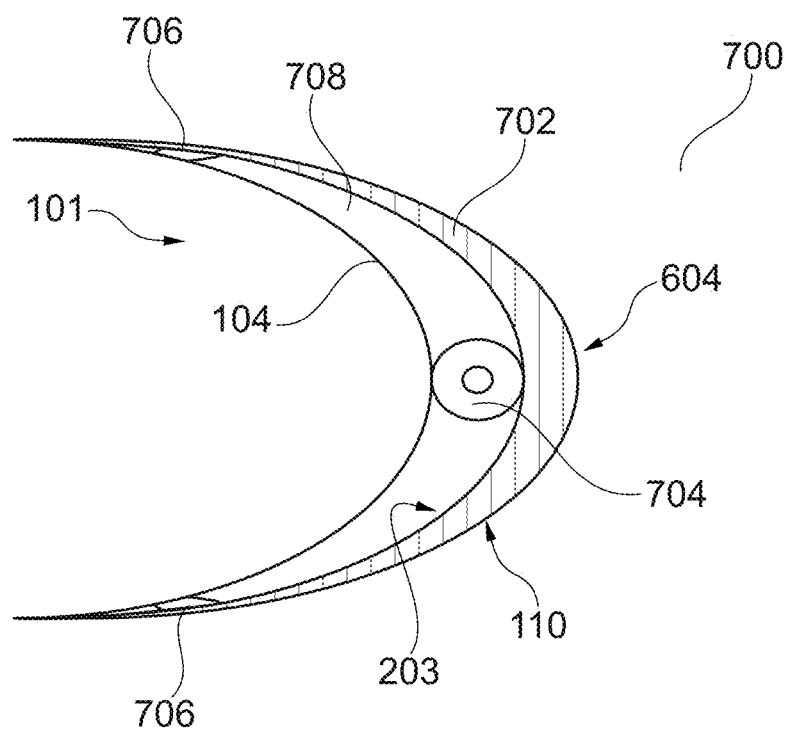
FIG. 7 is a diagrammatical representation of one embodiment of a conductive segment employed in the lightning protection subsystem of FIG. 6.

FIG. 7 is a diagrammatical representation 700 of one embodiment of a conductive segment employed in the lightning protection subsystem of FIG. 6. Specifically, FIG. 7 depicts a conductive segment 604 disposed on the wind blade 101 when viewed in direction 606 (as shown in FIG. 6). As represented in the example of FIG. 7, the conductive segment 604 is disposed on the leading edge 104 of the wind blade 101.

The conductive segment 604 includes an outer covering 702 and a conductor 704. The conductive segment 604, specifically, the outer covering 702 includes a coupling portion 203. In the example of FIG. 7, the coupling portion 203 includes clip-on elements 706. In FIG. 7, the outer covering 702 is clipped on the leading edge 104 using clip-on elements 706. Accordingly, the outer covering 702 is securely coupled to the leading edge 104 of the wind blade 101.

In one embodiment, the outer covering 702 may be made of a single elongated piece such that a single outer covering 702 is configured to be coupled on the entire length of the leading edge 104. In another embodiment, the outer covering 702 may be made of multiple segments, where the segments are disposed adjacent to one another to form a continuous covering along the length of the leading edge 104.

The outer covering 702 may be made of an insulator. In one example, the outer covering includes composite. In one example, the composite may be the same material which is used to manufacture the wind blade shells. In another example, the outer covering 702 may be formed of a thermoplastic material.

In another embodiment, the outer covering 702 is prefabricated on the wind blade leading edge 104. Geometry of the outer covering 702 is such that it provides a smooth surface. Specifically, the outer covering 702 allows smooth flow of air along the leading edge portion of the wind blade 101.

In the example of FIG. 7, the conductor 704 is disposed on the leading edge 104 of the wind blade 101. Specifically, the conductor 704 is disposed in a cavity 708 formed between the leading edge 104 and the outer covering 702. In one example, the conductor 704 is a single piece elongated structure disposed along the length of the leading edge 104 and enclosed by the outer covering 702. In the event of any fault in the conductor 704, the outer covering 702 may be removed and the conductor 704 may be repaired/replaced. In another example, the conductor 704 is formed by several adjacent conductive segments, such as the conductive segment 202 of FIG. 4, for an easier replacement in case of a defect/damage.

Figure 8:
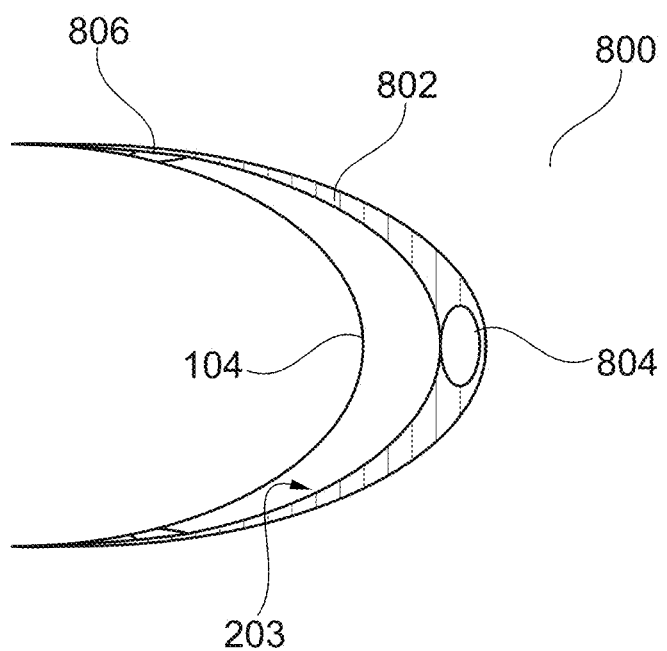
FIG. 8 is a diagrammatical representation of another embodiment of a conductive segment employed in the lightning protection subsystem of FIG. 6.
Figure 9:
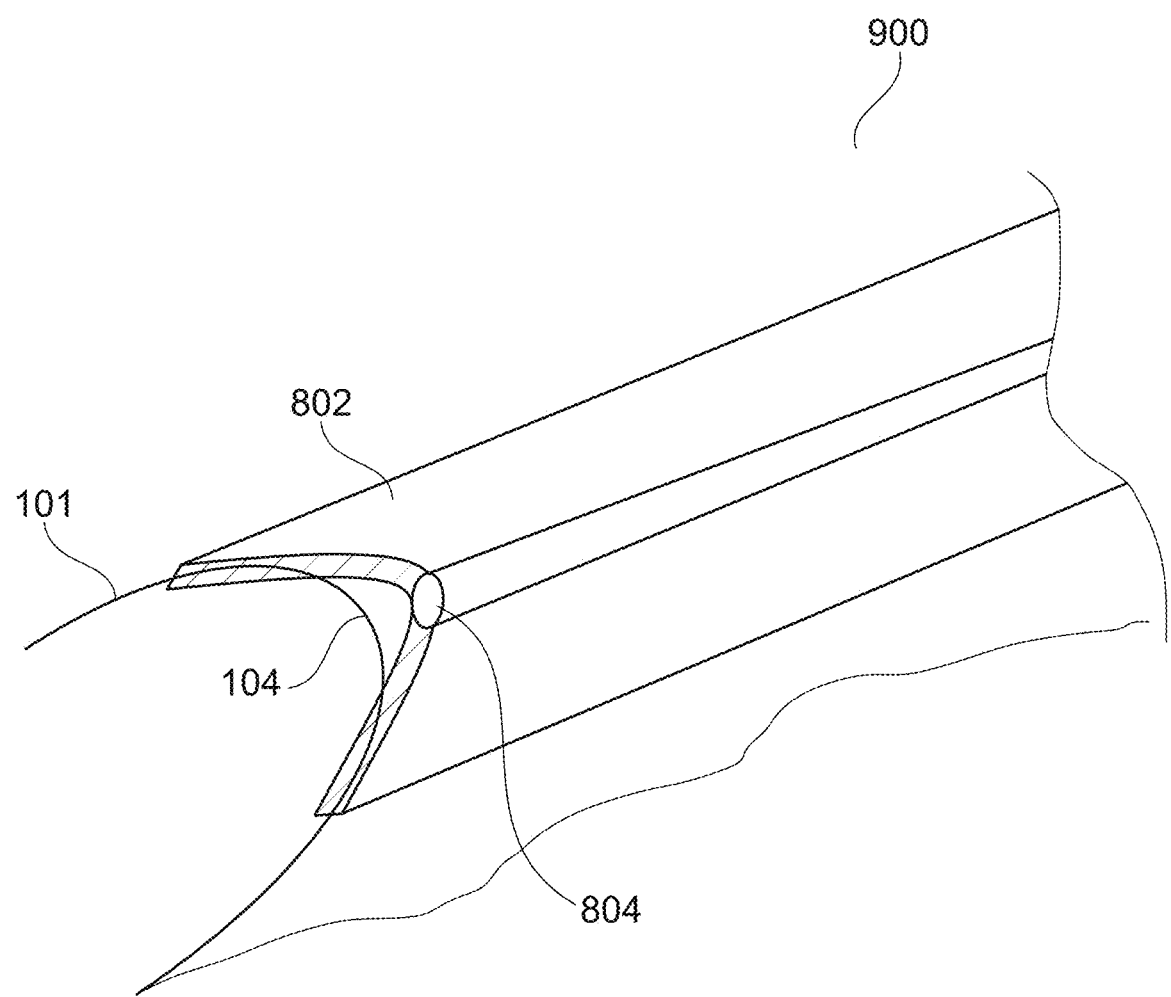
FIG. 9 is another diagrammatical representation of the embodiment of FIG. 8.

FIGS. 8 and 9 are different diagrammatical representations 800, 900 of other embodiments of a conductive segment employed in the lightning protection subsystem of FIG. 6. The conductive segment includes an outer covering 802 and a conductor 804. The conductor 804 is embedded in the outer covering 802. The outer covering 802, having the conductor 804, is disposed along the leading edge 104 of the wind blade 101. Specifically, the outer covering 802 is coupled along the leading edge 104 of the wind blade 101 via a coupling portion 203. The coupling portion 203 includes clip on elements 806. In another embodiment, the coupling portion 203 may include other fasteners, click mechanism, rail-based mechanism and the like.

In yet another embodiment, the coupling portion 203 may be a concave surface of the conductive segment 800. The concave surface of the conductive segment 800 aids in securely coupling the conductive segment 800 on the leading edge 104 of the wind blade 101. In such an embodiment, an adhesive, glue, and double-sided adhesive tapes may also be used for securely coupling the conductive segment 800 to the leading edge 104 of the wind blade 101. Specifically, the outer covering 802 of the conductive segment 800 may be coupled to the leading edge 104 of the wind blade 101.

Accordingly, the conductor 804 embedded in the outer covering 802 runs along the leading edge 104 of the wind blade 101 as clearly depicted in FIG. 9. In the example of FIG. 9, the conductor 804 may be a single piece elongated conductor. In another embodiment, the conductor 804 may be formed using multiple conductive segments.

The outer covering 802 with the embedded conductor 804 offers a smooth outer surface of the wind blade 101 to allow turbulence free flow of air. Accordingly, the outer covering 802 aids in providing an aerodynamic profile for the wind blade 101. Further, in one embodiment, the outer covering 802, with embedded conductor 804, may be prefabricated along the leading edge 104 of the wind blade 101.

Figure 10:
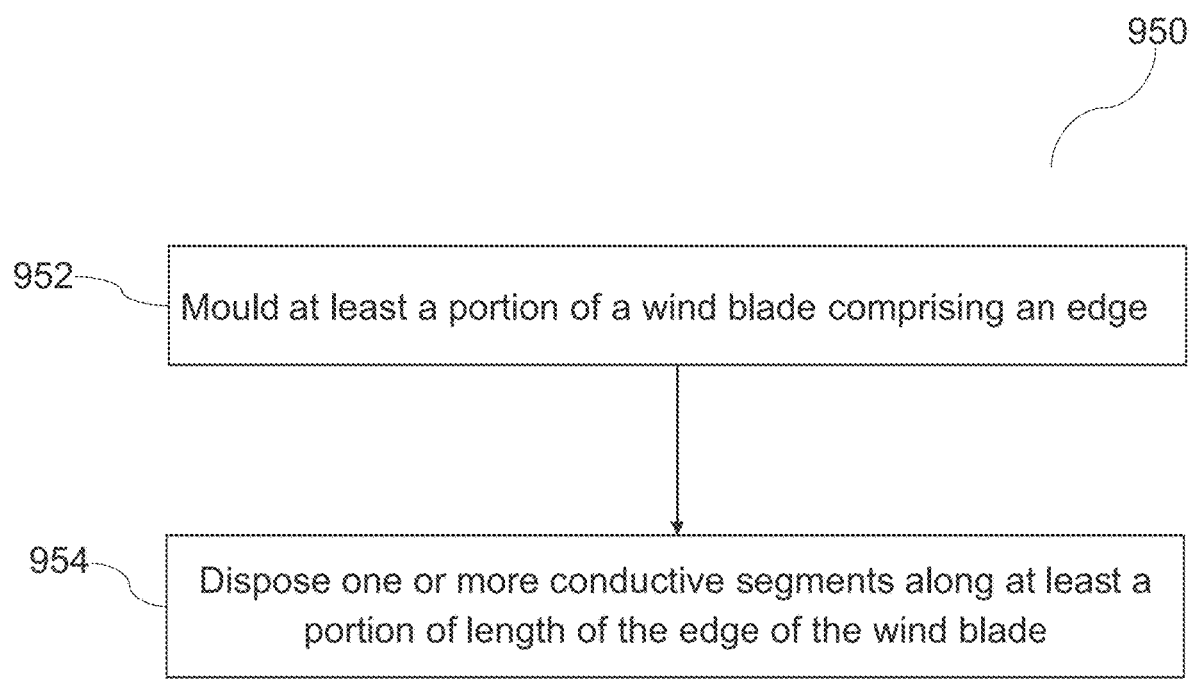
FIG. 10 is a flow chart representation of a method of manufacturing a wind blade having a lightning protection subsystem.

FIG. 10 is a flow chart 950 representation of a method of manufacturing a wind blade having a lightning protection subsystem. At step 952, at least a portion of a wind blade is moulded. Specifically, the wind blade 101 is manufactured in a mould in such a manner to form one or more receiving units along an edge of the wind blade. The edge includes a trailing edge, in one example.

In one embodiment, the receiving units have a determined depth, length, and width. The dimensions of the receiving units vary from the root portion to the tip portion of the wind blade. The dimensions of the receiving units along the trailing edge are determined prior to moulding. Accordingly, the moulds are prepared to manufacture a wind blade having desired dimension of receiving units. In another embodiment, the receiving units may be a seamless, smooth, and aerodynamic surface along the edge of the wind blade.

Additionally, at step 954, one or more conductive segments are disposed along at least a portion of length of the edge of the wind blade. In one embodiment, the one or more conductive segments are disposed adjacent to one another along the length of the edge. Specifically, in one example, the conductive segments are securely positioned in the one or more receiving units along the trailing edge of the wind blade. Further, the conductive segments are coupled to the trailing edge of the wind blade. The one or more conductive segments form an elongated lightning conducting path of the lightning protection subsystem along length of the trailing edge. Accordingly, the lightning conducting path is easily accessible from the outer surface of the wind blade. In another embodiment, the conductive segments may be disposed along the length of the leading edge of the wind blade.

According to aspects of the present specification, a wind blade having a lightning protection subsystem and a method of manufacture of such a wind blade is disclosed. In accordance with aspects of the present specification, the one or more conductive segments are disposed along the trailing/leading edge of the wind blade. The combination of the conductive segments aids in forming a lightning conducting path of the wind blade. Since the lightning conducting path is disposed along the trailing/leading edge on outer surface of the wind blade and is formed using one or more conductive segments, it is relatively easier to repair any faults in the lightning conducting path. Although the proposed system and method has been described with respect to single piece wind blade, this system and method may also find application in modular blades, split blades, wind blades with pin joint, and the like.

While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof.

The invention claimed is:

1. A lightning protection subsystem for a wind blade, wherein the lightning protection subsystem comprises:
   one or more conductive segments, wherein each of the one or more conductive segments comprises:
      a conductor; and
      a coupling portion, wherein the coupling portion is configured to secure the one or more conductive segments to an edge of the wind blade,
   wherein the one or more conductive segments form an elongated lightning conducting path along at least a portion of a length of the edge, at an outer surface of the wind blade, and
   wherein the one or more conductive segments comprise a plurality of conductive segments, wherein an airgap is located between at least two of the plurality of conductive segments to form a complete separation therebetween, and wherein the airgap aids in conduction of electrical current.

2. The lightning protection subsystem according to claim 1, wherein at least one connecting segment of the plurality of connecting segments is disposed between two conductive segments of the one or more conductive segments.

3. The lightning protection subsystem according to claim 1, wherein the plurality of connecting segments is made of flexible material.

4. The lightning protection subsystem according to claim 1, wherein the one or more conductive segments comprise an outer covering wrapping at least partially the conductor, and wherein the outer covering comprises an insulator and optionally the insulator comprises composites, a thermoplastic material, or a combination thereof.

5. The lightning protection subsystem according to claim 1, wherein the one or more conductive segments are configured to provide a desired aerodynamic profile of the wind blade.

6. The lightning protection subsystem according to claim 1, wherein first dimensions of the one or more conductive segments vary along the length of the edge of the wind blade and optionally the first dimensions of the one or more conductive segments comprise at least one of thickness and width of the one or more conductive segments.

7. The lightning protection subsystem according to claim 1, wherein the one or more conductive segments have a spanwise tapering geometry.

8. The lightning protection subsystem according to claim 1, wherein the one or more conductive segments comprise at least one of carbon fibres and conductive metals.

9. The lightning protection subsystem according to claim 1, wherein at least one conductive segment of the one or more conductive segments is disposed at a tip end of the wind blade and optionally the at least one conductive segment disposed at the tip end of the wind blade acts as a toroid of the lightning protection subsystem.

10. The lightning protection subsystem according to claim 1, wherein the edge of the wind blade is at least one of a leading edge and a trailing edge.

11. The lightning protection subsystem according to claim 1, wherein the coupling portion of the one or more conductive segments comprises one or more first attachment subunits.

12. The lightning protection subsystem according to claim 1, wherein the one or more conductive segments form a portion of an aerofoil surface of the wind blade.

13. The lightning protection subsystem according to claim 1, wherein the elongated lightning conducting path comprises a lightning conductor, a lightning conducting cable, or a combination thereof.

14. A wind blade comprising a lightning protection subsystem according to claim 1.

15. The wind blade according to claim 14, wherein one or more conductive segments are secured to the edge of the wind blade using an adhesive.

16. The wind blade according to claim 14, wherein the wind blade comprises one or more receiving units along the edge of the wind blade.

17. The wind blade according to claim 16, wherein the coupling portion of each of the one or more conductive segments is received within the corresponding receiving unit of the one or more receiving units.

18. The wind blade according to claim 16, wherein second dimensions of the one or more receiving units complement the first dimensions of the one or more conductive segments and/or wherein the second dimensions of the one or more receiving units comprises at least of depth, length, and width of the one or more receiving units.

19. A method of manufacturing a wind blade having a lightning protection subsystem, comprising:
moulding at least a portion of a wind blade; and
disposing one or more conductive segments along at least a portion of length of an edge of the wind blade, wherein the one or more conductive segments comprise a conductor and a coupling portion, wherein the coupling portion is configured to secure the one or more conductive segments to the edge of the wind blade, and wherein the one or more conductive segments form an elongated lightning conducting path along at least a portion of a length of the edge, at an outer surface of the wind blade, and wherein the one or more conductive segments comprise a plurality of conductive segments, wherein an airgap is located between at least two of the plurality of conductive segments to form a complete separation therebetween, and wherein the airgap aids in conduction of electrical current.

20. A lightning protection subsystem for a wind blade, wherein the lightning protection subsystem comprises:
one or more conductive segments, wherein each of the one or more conductive segments comprises:
a conductor; and
a coupling portion, wherein the coupling portion is configured to secure the one or more conductive segments to an edge of the wind blade,
wherein the one or more conductive segments form an elongated lightning conducting path along at least a portion of a length of the edge, the lightning conducting path being disposed on an outer surface of the wind blade, and
wherein the outer surface of the wind blade comprises the conductor of the one or more conductive segments or an outer insulating wrapping at least partially covering the conductor;
wherein the one or more conductive segments form a portion of an aerofoil surface of the wind blade, and
wherein the one or more conductive segments each have a substantially triangular cross-sectional shape that defines a cross-sectional shape of a trailing edge of the wind blade.

21. The lightning protection subsystem according to claim 20, wherein the conductor and/or the outer insulating wrapping have a substantially triangular cross-sectional shape.

22. A lightning protection subsystem for a wind blade, wherein the lightning protection subsystem comprises:
one or more conductive segments, wherein each of the one or more conductive segments comprises:
a conductor; and
a coupling portion, wherein the coupling portion is configured to secure the one or more conductive segments to an edge of the wind blade,
wherein the one or more conductive segments form an elongated lightning conducting path along at least a portion of a length of the edge, at an outer surface of the wind blade,
wherein the wind blade comprises one or more receiving units positioned along the edge of the wind blade,
wherein the coupling portion of each of the one or more conductive segments is received within a corresponding receiving unit of the one or more receiving units,
wherein the coupling portion of the one or more conductive segments comprises a plurality of discrete first attachment subunits, and wherein second dimensions of the one or more receiving units complement first dimensions of the one or more conductive segments;

wherein the one or more conductive segments form a portion of an aerofoil surface of the wind blade, and wherein the one or more conductive segments each have a substantially triangular cross-sectional shape that defines a cross-sectional shape of a trailing edge of the wind blade.

\* \* \* \* \*